United States Patent
Lo et al.

(10) Patent No.: US 9,714,301 B2
(45) Date of Patent: Jul. 25, 2017

(54) HETEROGENEOUS CATALYST AND METHOD FOR SELECTIVELY HYDROGENATING COPOLYMER UTILIZING THE SAME

(71) Applicant: INDUSTRIAL TECHNOLOGY RESEARCH INSTITUTE, Hsinchu (TW)

(72) Inventors: Man-Yin Lo, Zhubei (TW); Ying-Chieh Chen, Dacun Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/264,428

(22) Filed: Apr. 29, 2014

(65) Prior Publication Data
US 2015/0031835 A1  Jan. 29, 2015

(30) Foreign Application Priority Data
Jul. 23, 2013 (TW) .............................. 102126217 A

(51) Int. Cl.
| C08F 8/04 | (2006.01) |
| B01J 23/42 | (2006.01) |
| B01J 23/656 | (2006.01) |
| B01J 23/46 | (2006.01) |
| B01J 23/44 | (2006.01) |
| B01J 21/06 | (2006.01) |
| B01J 37/02 | (2006.01) |

(52) U.S. Cl.
CPC ............... C08F 8/04 (2013.01); B01J 21/063 (2013.01); B01J 23/42 (2013.01); B01J 23/44 (2013.01); B01J 23/468 (2013.01); B01J 23/6567 (2013.01); B01J 37/0201 (2013.01); B01J 37/0207 (2013.01)

(58) Field of Classification Search
None
See application file for complete search history.

(56) References Cited

U.S. PATENT DOCUMENTS

| 4,452,951 A | 6/1984 | Kubo et al. |
| 4,501,685 A | 2/1985 | Thomson et al. |
| 4,501,857 A | 2/1985 | Kishimoto et al. |
| 4,560,817 A | 12/1985 | Bobsein et al. |
| 4,629,767 A * | 12/1986 | Shyr ..................... C08C 19/02 525/333.7 |
| 4,673,714 A | 6/1987 | Kishimoto et al. |
| 4,980,421 A | 12/1990 | Teramoto et al. |
| 5,028,665 A | 7/1991 | Hucul |
| 5,039,755 A | 8/1991 | Chamberlain et al. |
| 5,110,779 A | 5/1992 | Hucul |
| 5,206,307 A | 4/1993 | Chamberlain et al. |
| 5,352,744 A | 10/1994 | Bates et al. |
| 5,985,995 A | 11/1999 | Calle et al. |
| 6,180,553 B1 | 1/2001 | Masi et al. |
| 6,246,390 B1 | 6/2001 | Rosenberg |
| 6,299,802 B1 | 10/2001 | Parsons et al. |
| 6,313,230 B1 | 11/2001 | Tsai et al. |
| 6,350,820 B1 | 2/2002 | Hahnfeld et al. |
| 6,376,621 B1 | 4/2002 | Hahnfeld et al. |
| 6,376,622 B1 | 4/2002 | Hucul |
| 6,426,390 B1 | 7/2002 | Hahnfeld et al. |
| 6,451,924 B1 | 9/2002 | Hahnfeld et al. |
| 6,461,993 B1 | 10/2002 | Van Der Heijden et al. |
| 6,538,168 B1 | 3/2003 | Schwab et al. |
| 6,632,890 B1 | 10/2003 | Bates et al. |
| 6,673,950 B1 | 1/2004 | Teles et al. |
| 6,800,725 B2 | 10/2004 | Hofman et al. |
| 6,809,217 B1 | 10/2004 | Colley et al. |
| 6,815,475 B2 | 11/2004 | Donald et al. |
| 6,881,797 B2 | 4/2005 | Lin et al. |
| 6,914,091 B2 | 7/2005 | Donald et al. |
| 6,951,906 B1 | 10/2005 | Ko et al. |
| 7,053,156 B2 | 5/2006 | Christiaens et al. |
| 7,186,782 B2 | 3/2007 | Lin et al. |
| 7,265,184 B2 | 9/2007 | Dath et al. |

(Continued)

FOREIGN PATENT DOCUMENTS

| CN | 1418226 A | 5/2003 |
| CN | 1549831 A | 11/2004 |

(Continued)

OTHER PUBLICATIONS

Bates et al. "PCHE-Based Pentablock Copolymers: Evolution of a New Plastic", AIChE Journal, Apr. 2001, vol. 47, No. 4, 762-765.
Gehlsen et al. "Heterogeneous Catalytic Hydrogenation of Poly(styrene): Thermodynamics of Poly(vinylcyclohexane) Containing Diblock Copolymers", Macromolecules 1993, 26, 4122-4127.
Ness et al. "Molecular Weight Effects in the Hydrogenation of Model Polystyrenes Using Platinum Supported on Wide-Pore Silica", Macromolecules 2002, 35, 602-609.
Taiwan Office Action for Appl. No. 102126217 dated Dec. 16, 2014.
Chinese Office Action and Search Report for Chinese Application No. 201310392002.5, dated Jun. 22, 2016.

*Primary Examiner* — Jeffrey Mullis

(74) *Attorney, Agent, or Firm* — Birch, Stewart, Kolasch & Birch, LLP

(57) ABSTRACT

Disclosed is a method for selectively hydrogenating a copolymer, including contacting a heterogeneous catalyst with a copolymer to process hydrogenation. The copolymer includes aromatic rings and double bonds, and the double bonds are hydrogenated, and the aromatic rings are substantially not hydrogenated. The heterogeneous catalyst includes a metal catalyst such as platinum, palladium, platinum-iridium alloy, or platinum-rhenium alloy formed on a porous support. The hydrogenation is processed at a temperature of 40° C. to 150° C. under a hydrogen pressure of 10 kg/cm$^2$ to 50 kg/cm$^2$.

9 Claims, No Drawings

(56) References Cited

U.S. PATENT DOCUMENTS

| | | |
|---|---|---|
| 7,332,634 B2 | 2/2008 | Bassler et al. |
| 7,459,593 B1 | 12/2008 | Krupa et al. |
| 7,550,064 B2 | 6/2009 | Bassler et al. |
| 7,612,148 B2 | 11/2009 | Tsai et al. |
| 7,700,694 B2 | 4/2010 | Lin et al. |
| 2001/0048991 A1 | 12/2001 | Martin et al. |
| 2001/0051691 A1* | 12/2001 | Hahnfeld ............... C08F 8/04 525/338 |
| 2002/0002233 A1 | 1/2002 | Hahn et al. |
| 2002/0061981 A1 | 5/2002 | Donald et al. |
| 2002/0061982 A1 | 5/2002 | Donald et al. |
| 2003/0119971 A1 | 6/2003 | Donald et al. |
| 2003/0144418 A1 | 7/2003 | Donald et al. |
| 2003/0207983 A1 | 11/2003 | Sone et al. |
| 2005/0137353 A1* | 6/2005 | Christiaens ........... C08F 8/04 525/332.9 |
| 2005/0211541 A1 | 9/2005 | Bassler et al. |
| 2005/0222342 A1 | 10/2005 | Dath et al. |
| 2005/0240037 A1 | 10/2005 | Bassler et al. |
| 2005/0250965 A1 | 11/2005 | Bassler et al. |
| 2006/0014969 A1 | 1/2006 | Bassler et al. |
| 2010/0041929 A1 | 2/2010 | Bedard et al. |
| 2010/0240937 A1 | 9/2010 | Gartside et al. |
| 2010/0331171 A1 | 12/2010 | Gajda et al. |
| 2010/0331588 A1 | 12/2010 | Gajda et al. |
| 2011/0065572 A1 | 3/2011 | Olken et al. |
| 2013/0035225 A1 | 2/2013 | Barbaro et al. |
| 2015/0094423 A1* | 4/2015 | Hsu et al. .................... 525/98 |

FOREIGN PATENT DOCUMENTS

| | | |
|---|---|---|
| CN | 102002137 A | 4/2011 |
| TW | 184586 | 5/1992 |
| TW | 238314 | 1/1995 |
| TW | 244955 | 4/1995 |
| TW | 519536 B | 2/2003 |
| TW | 527336 B | 4/2003 |
| TW | 546307 B | 8/2003 |
| TW | 200418782 A | 10/2004 |
| TW | 200523351 | 7/2005 |
| TW | 200728388 | 8/2007 |
| TW | 200836831 A | 9/2008 |
| TW | 200843847 A | 11/2008 |
| TW | 200843850 A | 11/2008 |
| TW | 201020230 A | 6/2010 |
| TW | 201038520 A | 11/2010 |
| TW | 201100370 A | 1/2011 |
| TW | 201100371 A | 1/2011 |
| TW | I344460 B | 7/2011 |
| TW | 201141607 A | 12/2011 |
| WO | WO 2008/060992 A2 | 5/2008 |
| WO | WO 2008/060993 A2 | 5/2008 |

* cited by examiner

HETEROGENEOUS CATALYST AND METHOD FOR SELECTIVELY HYDROGENATING COPOLYMER UTILIZING THE SAME

CROSS REFERENCE TO RELATED APPLICATIONS

The application is based on, and claims priority from, Taiwan Application Serial Number 10216217, filed on Jul. 23, 2013, the disclosure of which is hereby incorporated by reference herein in its entirety

TECHNICAL FIELD

The technical field relates to a heterogeneous catalyst, and in particular, relates to selective hydrogenate copolymers utilizing the same.

BACKGROUND

SBS and SIS belong to a styrene-based thermoplastic elastomer (also named styrenic block copolymers, SBCs) with properties of thermoplastic plastics and rubbers. For example, the SBCs are similar to rubber at room temperature due to their softness, toughness, and flexibility. Furthermore, the SBCs at high temperature are flowable and moldable. As with natural rubber and the synthetic rubber, the SBCs are classified as a third generation rubber. In the thermoplastic elastomer field, the SBCs' properties are mostly similar to that of rubber. In addition, the SBCs are the greatest yield thermoplastic elastomers in global. In recent years, SBCs include four types: styrene-butadiene-styrene block copolymer (SBS), styrene-isopentadiene-styrene block copolymer (SIS), styrene-ethylene-butylene-styrene block copolymer (SEBS), and styrene-ethylene-propylene-styrene block copolymer (SEPS). The SEBS and the SEPS are a hydrogenated SBS and SIS, respectively. The SEBS and the SEPS with excellent properties have a higher price (2 to 4 times) than that of the SBS and the SIS. The SBS is the most commonly SBC that is mass produced (over 70%), has the lowest-cost of the SBCs, and the more widely used product among the SBCs. The SBS is a triblock copolymer polymerized of styrene and butadiene. The SBS sir simultaneously has plastic and rubber properties, and is the greatest yield thermoplastic elastomer due to its excellent chemical resistance, excellent tensile strength, high surface friction coefficient, excellent low temperature properties, excellent electrical properties, and excellent processibility.

The polybutadiene segment of the SBS and the polyisopentadiene diene segment of the SIS include carbon-carbon double bonds. As such, the SBS and SIS have disadvantages such as low thermal resistance and low climate resistance (e.g. ozone resistance, UV resistance, and oxygen resistance). The disadvantages can be overcome by hydrogenating the carbon-carbon double bonds of the polybutadiene segment and the polyisopentadiene segment, thereby forming the SEBS (see Formula 1) and the SEPS (see Formula 2), respectively. The hydrogenated products SEBS and SEPS can be applied as engineering and medical materials due to better climate resistance and properties.

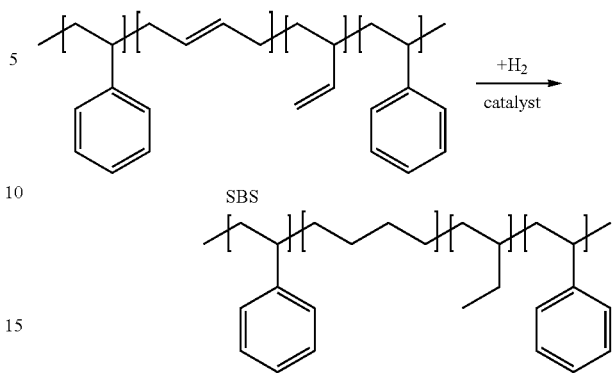

(Formula 1)

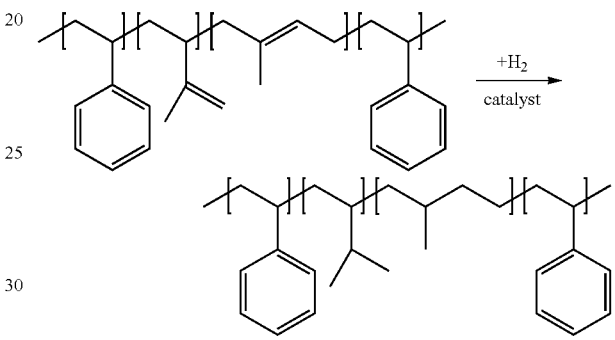

(Formula 2)

Accordingly, a novel method and corresponding catalyst for forming the SEBS and the SEPS is called for, e.g. selectively hydrogenating the carbon-carbon double bonding of the SBS and the SIS without hydrogenating the aromatic ring of the SBS and the SIS.

SUMMARY

One embodiment of the disclosure provides a method for selectively hydrogenating a copolymer, comprising: contacting a heterogeneous catalyst with a copolymer including aromatic rings and double bonds to process a hydrogenation at a temperature of 40° C. to 150° C. under a hydrogen pressure of 10 kg/cm$^2$ to 50 kg/cm$^2$ for hydrogenating the double bonds and substantially not hydrogenating the aromatic rings, wherein the heterogeneous catalyst comprises a metal catalyst formed on a porous support, and the metal catalyst comprises platinum, palladium, platinum-rhenium alloy, or platinum-iridium alloy.

One embodiment of the disclosure provides a heterogeneous catalyst, including a metal catalyst formed on a porous support, wherein the metal catalyst comprises platinum, palladium, platinum-rhenium alloy, or platinum-iridium alloy, and the porous support comprises titanium oxide, aluminum oxide, zirconium oxide, or silicon oxide.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides a method for selectively hydrogenating a copolymer. First, the copolymer and a heterogeneous catalyst are contacted to process hydrogenation. The heterogeneous catalyst is a metal catalyst such as platinum, palladium, platinum-rhenium alloy, or platinum-iridium alloy formed on a porous support such as titanium oxide, aluminum oxide, zirconium oxide, or silicon oxide. In one embodiment, the platinum and the iridium (or rhenium) had a weight ratio of 5:0.1 to 1:5. A catalyst with an overly low amount of platinum has low activity, thereby reducing the hydrogenation yield. The porous support has a specific surface area of greater than or equal to 40 $m^2/g$. On the basis of the total weight (100 wt %) of the porous support and the metal catalyst of the heterogeneous catalyst, the heterogeneous catalyst contains 0.2 wt % to 10 wt % of the metal catalyst. Alternatively, the heterogeneous catalyst contains 1 wt % to 5 wt % of the metal catalyst. A catalyst with an overly low amount of the metal catalyst has low activity, thereby reducing the hydrogenation yield. A catalyst with an overly high amount of the metal catalyst has a high cost, thereby lacking economic benefits.

The heterogeneous palladium catalyst can be formed by an incipient wetness method. For example, palladium acetate is dissolved in water, and the water volume is equal to the pore volume of the porous support. A dried porous support is soaked in the aqueous solution, and the water thereof is then removed, and the palladium salt adsorbed on the porous support is then heated to 120° C. to directly form palladium on the porous support, e.g. $Pd/TiO_2$, $Pd/SiO_2$, $PdZrO_2$, or $Pd/Al_2O_3$.

The heterogeneous platinum catalyst can be formed by an incipient wetness method. For example, platinum salt such as $H_2PtCl_6$ is dissolved in water, and the water volume is equal to the pore volume of the porous support. A dried porous support is soaked in the aqueous solution, and the water thereof is then removed, and the platinum salt adsorbed on the porous support is then heated to 120° C. to directly form platinum on the porous support, e.g. $Pt/TiO_2$, $Pt/SiO_2$, $Pt/ZrO_2$, or $Pt/Al_2O_3$.

The heterogeneous platinum-iridium catalyst can be formed by an incipient wetness method. For example, an appropriate ratio of platinum salt (such as $H_2PtCl_6$) and iridium salt (such as $IrCl_3$) are dissolved in water, and the water volume is equal to the pore volume of the porous support. A dried porous support s soaked in the aqueous solution, and the water thereof is then removed, and the metal salt adsorbed on the porous support is then heated and hydrogenated, and the chemically reduced metal salt is passivated by air to form a platinum-iridium alloy on the porous support, e.g. Pt—$Ir/TiO_2$, Pt—$Ir/SiO_2$, Pt—$Ir/ZrO_2$, or Pt—$Ir/Al_2O_3$.

The heterogeneous platinum-rhenium catalyst can be formed by an incipient wetness method. For example, platinum salt such as ($H_2PtCl_6$) and rhenium salt (such as $HReCl_4$ or $HReO_4$) are dissolved in water, and the water volume is equal to the pore volume of the porous support. A dried porous support is soaked in the aqueous solution, and the water thereof is then removed, and the metal salt adsorbed on the porous support is then heated and hydrogenated, and the chemically reduced metal salt is passivated by air to form a platinum-rhenium alloy on the porous support, e.g. Pt—$Re/TiO_2$, Pt—$Re/SiO_2$, Pt—$Re/ZrO_2$, or Pt—$Re/Al_2O_3$.

In one embodiment, the copolymer can be polymerized of polyenic monomer and vinyl aromatic monomer. The polyenic monomer can be butadiene, isopentadiene, other monomers having at least two carbon-carbon double bonds, or combinations thereof. The vinyl aromatic monomer can be styrene, α-methylstyrene, other vinyl aromatic monomers, or combinations thereof. The copolymer includes an aromatic ring and carbon-carbon double bond, such as the SBS (copolymerized of styrene and butadiene) or the SIS (polymerized of styrene and isopentadiene).

In one embodiment, hydrogenation is performed at a temperature of 40° C. to 150° C. under a hydrogen pressure of 10 $kg/cm^2$ 50 $kg/cm^2$. In another embodiment, hydrogenation is performed at a temperature of 70° C. to 120° C. under a hydrogen pressure of 30 $kg/cm^2$ to 40 $kg/cm^2$. Hydrogenation cannot be performed at an overly low temperature and/or under an overly low hydrogen pressure. Hydrogenation not only hydrogenates the carbon-carbon double bonds of the copolymer, but also hydrogenates the aromatic rings of the copolymer at an overly high temperature and/or under an overly high hydrogen pressure.

Accordingly, the disclosed heterogeneous catalyst may selectively hydrogenate the carbon-carbon double bonds of the copolymer, and substantially not hydrogenate the aromatic rings of the copolymer. For example, only less than 5% of the aromatic rings in the copolymer are hydrogenated, but more than 97% of the carbon-carbon double bonds in the copolymer are hydrogenated.

Below exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation Example 1

9.55 g of $SiO_2$ (Q50, commercially available from Fuji silysia) serving as a porous support was put into an oven at 110° C. to be dried overnight, and then put into a round bottom bottle. 7.35 g of $H_2PtCl_6$ and 1.55 g of $IrCl_3$ were dissolved in water. The aqueous solution was added to the round bottom bottle and stood for 2 hours, whereby the metal salts were adsorbed on the porous support. The mixture in the round bottom bottle was heated to 110° C. and vacuumed to remove water thereof to obtain a dried powder. The dried powder was put into a glass tube, 2 vol % of hydrogen was then conducted through the glass tube, and the dried powder was heated to 200° C. and left at 200° C. for 4 hours. As a result the metal salts adsorbed on the porous support were chemically reduced. The heated powder was cooled to room temperature, and air was then conducted through the glass tube to passivate the catalyst surface. Therefore, a 3.5 wt % Pt-1 wt % Ir/95.5 wt % $SiO_2$ catalyst was completed.

Preparation Example 2

9.8 g of $SiO_2$ (Q50, commercially available from Fuji silysia) serving as a porous support was put into an oven at 110° C. to be dried overnight, and then put into a round bottom bottle, 4.22 g of palladium acetate was dissolved in water. The aqueous solution was added to the round bottom bottle and stood for 2 hours, whereby the metal salt was adsorbed on the porous support. The mixture in the round bottom bottle was heated to 110° C. and vacuumed to remove water thereof to obtain a dried powder, 2 wt % Pd/98 wt % $SiO_2$ catalyst.

Preparation Example 3

9.8 g of $ZrO_2$ (XZ16075, commercially available from Norpro) serving as a porous support was put into an oven at 110° C. to be dried overnight, and then put into a round bottom bottle. 4.22 g of palladium acetate was dissolved in water. The aqueous solution was added to the round bottom bottle and stood for 2 hours, whereby the metal salt was adsorbed on the porous support. The mixture in the round bottom bottle was heated to 110° C. and vacuumed to remove water thereof to obtain a dried powder, 2 wt % Pd/198 wt % $ZrO_2$ catalyst.

Preparation Example 4

9.8 g of $Al_2O_3$ (IS0600, commercially available from UOP) serving as a porous support was put into an oven at 110° C. to be dried overnight, and then put into a round bottom bottle. 4.22 g of palladium acetate was dissolved in water. The aqueous solution was added to the round bottom bottle and stood for 2 hours, whereby the metal salt was adsorbed on the porous support. The mixture in the round bottom bottle was heated to 110° C. and vacuumed to remove water thereof to obtain a dried powder, 2 wt % Pd/98 wt % $Al_2O_3$ catalyst.

Preparation Example 5

9.55 g of $TiO_2$ (ST31119 commercially available from Norpro) serving as a porous support was put into an oven at 110° C. to be dried overnight, and then put into a round bottom bottle. 7.35 g of $H_2PtCl_6$ and 1.35 g of $HReO_4$ were dissolved in water. The aqueous solution was added to the round bottom bottle and stood for 2 hours, whereby the metal salts were adsorbed on the porous support. The mixture in the round bottom bottle was heated to 110° C. and vacuumed to remove water thereof to obtain a dried powder. The dried powder was put into a glass tube, 2 vol % of hydrogen was then conducted through the glass tube, and the dried powder was heated to 200° C. and left at 200° C. for 4 hours. As a result, the metal salts adsorbed on the porous support were chemically reduced. The heated powder was cooled to room temperature, and air was then conducted through the glass tube to passivate the catalyst surface. Therefore, a 3.5 wt % Pt-1 wt % Re/95.5 wt % $TiO_2$ catalyst was completed.

Preparation Example 6

9.65 g of $SiO_2$ (Q50, commercially available from Fuji silysia) serving as a porous support was put into an oven at 110° C. to be dried overnight, and then put into a round bottoms bottle. 7.35 g of $H_2PtCl_6$ was dissolved in water. The aqueous solution was added to the round bottom bottle and stood for 2 hours, whereby the metal salt was adsorbed on the porous support, The mixture in the round bottom bottle was heated to 110° C. and vacuumed to remove water thereof to obtain a dried powder. The dried powder was put into a glass tube, 2 vol % of hydrogen was then conducted through the glass tube, and the dried powder was heated to 200° C. and left at 200° C. for 4 hours. As a result, the metal salt adsorbed on the porous support was chemically reduced. The heated powder was cooled to room temperature, and air was then conducted through the glass tube to passivate the catalyst surface. Therefore, a 3.5 wt % Pt/96.5 wt % $SiO_2$ catalyst was completed.

Preparation Example 7

9.55 g of $SiO_2$ (Q50, commercially available from Fuji silysia) serving as a porous support was put into an oven at 110° C. to be dried overnight, and then put into a round bottom bottle. 7.35 g of $H_2PtCl_6$ and 1.35 g of $HReO_4$ were dissolved in water. The aqueous solution was added to the round bottom bottle and stood for 2 hours, whereby the metal salts were adsorbed on the porous support. The mixture in the round bottom bottle was heated to 110° C. and vacuumed to remove water thereof to obtain a dried powder. The dried powder was put into a glass tube, 2 vol % of hydrogen was then conducted through the glass tube, and the dried powder was heated to 200° C. and left at 200° C. for 4 hours. As a result the metal salts adsorbed on the porous support were chemically reduced. The heated powder was cooled to room temperature, and air was then conducted through the glass tube to passivate the catalyst surface. Therefore, a 3.5 wt % Pt-1 wt % Re/95.5 wt % $SiO_2$ catalyst was completed.

Example 1

9 g of the styrene-isopentadiene-styrene block copolymer (SIS, Kraton D1161) was dissolved in 111 g of cyclohexane to forma SIS solution (7.5 wt %). The SIS solution was put into a reaction vessel. 1.8 g of the Pt—Ir/$SiO_2$ catalyst prepared in Preparation Example 1 was added to the reaction vessel. The reaction vessel was sealed, and hydrogen of 40 kg/$cm^2$ was conducted to the reaction vessel. The reaction vessel was heated to 120° C. to process the hydrogenation for 2.6 hours, and the heating process was then stopped. The conversion ratio of the hydrogenation was measured by FT-IR and UV-VIS spectrometers, as tabulated in Table 1.

Example 2

9 g of the SIS (Kraton D1161) was dissolved in 111 g of cyclohexane to form a SIS solution (7.5 wt %). The SIS solution was put into a reaction vessel. 1.8 g of the Pd/$SiO_2$ catalyst prepared in Preparation Example 2 was added to the reaction vessel. The reaction vessel was sealed, and hydrogen of 40 kg/$cm^2$ was conducted to the reaction vessel. The reaction vessel was heated to 110° C. to process the hydrogenation for 4.2 hours, and the heating process was then stopped. The conversion ratio of the hydrogenation was measured by FT-IR and UV-VIS spectrometers, as tabulated in Table 1.

Example 3

9 g of the SIS (Kraton D1161) was dissolved 111 g of cyclohexane to form a SIS solution (7.5 wt %). The SIS solution was put into a reaction vessel. 1.8 g of the Pd/$ZrO_2$ catalyst prepared in Preparation Example 3 was added to the reaction vessel. The reaction vessel was sealed, and hydrogen of 40 kg/$cm^2$ was conducted to the reaction vessel. The reaction vessel was heated to 120° C. to process the hydrogenation for 3.5 hours, and the heating process was then stopped. The conversion ratio of the hydrogenation was measured by FT-IR and UV-VIS spectrometers, as tabulated in Table 1.

Example 4

9 g of the SIS (Kraton D1161.) was dissolved in 111 g of cyclohexane to form a SIS solution (7.5 wt %). The SIS solution was put into a reaction vessel. 1.8 g of the Pd/Al$_2$O$_3$ catalyst prepared in Preparation Example 4 was added to the reaction vessel. The reaction vessel was sealed, and hydrogen of 40 kg/cm$^2$ was conducted to the reaction vessel. The reaction vessel was heated to 120° C. to process the hydrogenation for 3.8 hours, and the heating process was then stopped. The conversion ratio of the hydrogenation was measured by FT-IR and UV-VIS spectrometers, as tabulated in Table 1.

Example 5

18 g of the styrene-butadiene-styrene block copolymer (SBS, Aldrich 182877) was dissolved in 102 g of cyclohexane to form an SBS solution (15 wt %). The SBS solution was put into a reaction vessel, 1.2 g of the Pt—Re/TiO$_2$ catalyst prepared in Preparation Example 5 was added to the reaction vessel. The reaction vessel was sealed, and hydrogen of 40 kg/cm$^2$ was conducted to the reaction vessel. The reaction vessel was heated to 100° C. to process the hydrogenation for 0.41 hours, and the heating process was then stopped. The conversion ratio of the hydrogenation was measured by FT-IR and UV-VIS spectrometers, as tabulated in Table 1.

Example 6

18 g of the SBS (Aldrich 182877) was dissolved in 102 g of cyclohexane to form an SBS solution (15 wt %). The SBS solution was put into a reaction vessel. 1.2 g of the Pt—Re/TiO$_2$ catalyst prepared in Preparation Example 5 was added to the reaction vessel. The reaction vessel was sealed, and hydrogen of 40 kg/cm$^2$ was conducted to the reaction vessel. The reaction vessel was heated to 90° C. to process the hydrogenation for 0.49 hours, and the heating process was then stopped. The conversion ratio of the hydrogenation was measured by FT-IR and UV-VIS spectrometers, as tabulated in Table 1. Compared to Example 5, the product still had a high carbon-carbon double bond conversion ratio even with a lower hydrogenation temperature and a longer hydrogenation period.

Example 7

18 g of the SBS (Aldrich 182877) was dissolved in 102 g of cyclohexane to form an SBS solution (15 wt %). The SBS solution was put into a reaction vessel. 1.2 g of the Pt/SiO$_2$ catalyst prepared in Preparation Example 6 vas added to the reaction vessel. The reaction vessel was sealed, and hydrogen of 40 kg/cm$^2$ was conducted to the reaction vessel. The reaction vessel was heated to 100° C. to start the hydrogenation, and then slowly heated to 130° C. for total 6.4 hours, and the heating process was then stopped. The conversion ratio of the hydrogenation was measured by FT-IR and UV-VIS spectrometers, as tabulated in Table 1. Compared to Examples 5 and 6, the catalyst having platinum without other metals needed a longer hydrogenation period, and the hydrogenation product had a lower carbon-carbon double bond conversion ratio.

Example 8

18 g of the SBS (Aldrich 182877) was dissolved in 102 g of cyclohexane to form an SBS solution (15 wt %). The SBS solution was put into a reaction vessel. 1.2 g of the Pt—Re/SiO$_2$ catalyst prepared in Preparation Example 7 was added to the reaction vessel. The reaction vessel was sealed, and hydrogen of 40 kg/cm$^2$ as conducted to the reaction vessel. The reaction vessel was heated to 100° C., to process the hydrogenation for 0.95 hours, and the heating process was then stopped. The conversion ratio of the hydrogenation was measured by FT-IR and UV-VIS spectrometers as tabulated in Table 1. Compared to Examples 5 and 6, the catalyst with silicon oxide serving as the porous support ceded a longer hydrogenation period, and the hydrogenation product had a lower carbon-carbon double bond conversion ratio.

TABLE 1

| | | | Hydrogenation | | Conversion ratio (%) | |
| --- | --- | --- | --- | --- | --- | --- |
| | Catalyst | Copolymer | temperature (° C.) | Hydrogenation period (hour) | Double bond | Benzene ring |
| Example 1 | Pt—Ir/SiO$_2$ | SIS | 120 | 2.6 | 98 | <2 |
| Example 2 | Pd/SiO$_2$ | SIS | 110 | 4.2 | 97 | <5 |
| Example 3 | Pd/ZrO$_2$ | SIS | 120 | 3.5 | 99 | <1 |
| Example 4 | Pd/Al$_2$O$_3$ | SIS | 120 | 3.8 | 92 | <5 |
| Example 5 | Pt—Re/TiO$_2$ | SBS | 100 | 0.41 | 99 | <1 |
| Example 6 | Pt—Re/TiO$_2$ | SBS | 90 | 0.49 | 99 | <1 |
| Example 7 | Pt/SiO$_2$ | SBS | 130 | 6.4 | 92 | <1 |
| Example 8 | Pt—Re/SiO$_2$ | SBS | 100 | 0.95 | 98 | <1 |

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A method for selectively hydrogenating a copolymer, comprising:
    contacting a heterogeneous catalyst with a copolymer including aromatic rings and double bonds to process a hydrogenation at a temperature of 40° C. to 150° C. under a hydrogen pressure of 10 kg/cm$^2$ to 50 kg/cm$^2$ for hydrogenating the double bonds, wherein less than 5% of the aromatic rings are hydrogenated, wherein the heterogeneous catalyst consists of a metal catalyst formed on a porous support, and the metal catalyst is platinum-rhenium alloy.

2. The method as claimed in claim 1, wherein the porous support comprises titanium oxide, aluminum oxide, zirconium oxide, or silicon oxide.

3. The method as claimed in claim 1, wherein the copolymer is copolymerized of a polyenic monomer and a vinyl aromatic monomer.

4. The method as claimed in claim 3, wherein the polyenic monomer comprises butadiene, isopentadiene, or combinations thereof.

5. The method as claimed in claim 3, wherein the vinyl aromatic monomer comprises styrene, α-methylstyrene, or combinations thereof.

6. The method as claimed in claim 1, wherein the hydrogenation is processed at a temperature of 70° C. to 120° C. under a hydrogen pressure of 30 kg/cm$^2$ to 40 kg/cm$^2$.

7. The method as claimed in claim 1, wherein the metal catalyst has a platinum-rhenium weight ratio of 5:0.1 to 1:5.

8. The method as claimed in claim 1, wherein the heterogeneous catalyst comprises 0.2 wt % to 10 wt % of the metal catalyst.

9. The method as claimed in claim 1, wherein the heterogeneous catalyst comprises 1 wt % to 5 wt % of the metal catalyst.

\* \* \* \* \*